United States Patent
Sato et al.

(10) Patent No.: US 7,452,478 B2
(45) Date of Patent: *Nov. 18, 2008

(54) METHOD FOR CONVERTING AND PURIFYING MATERIALS FOR MODIFYING SURFACES OF SEMICONDUCTOR NANOPARTICLES

(75) Inventors: Keiichi Sato, Tokyo (JP); Susumu Kuwabata, Osaka (JP)

(73) Assignee: Hitachi Software Engineering Co., Ltd., Yokohama-shi (JP)

( * ) Notice: Subject to any disclaimer, the term of this patent is extended or adjusted under 35 U.S.C. 154(b) by 347 days.

This patent is subject to a terminal disclaimer.

(21) Appl. No.: 10/648,399

(22) Filed: Aug. 27, 2003

(65) Prior Publication Data

US 2004/0072428 A1    Apr. 15, 2004

(30) Foreign Application Priority Data

Aug. 30, 2002   (JP)   ............................ 2002-254628

(51) Int. Cl.
*H01L 21/00* (2006.01)

(52) U.S. Cl. ........................................ 216/94; 438/746

(58) Field of Classification Search ........................ None
See application file for complete search history.

(56) References Cited

U.S. PATENT DOCUMENTS

| | | | |
|---|---|---|---|
| 6,179,912 B1 * | 1/2001 | Barbera-Guillem et al. | ... 117/68 |
| 6,410,935 B1 * | 6/2002 | Rajh et al. | ............. 257/43 |
| 6,607,829 B1 * | 8/2003 | Bawendi et al. | .......... 428/403 |
| 6,649,138 B2 * | 11/2003 | Adams et al. | ............. 423/203 |
| 6,788,453 B2 * | 9/2004 | Banin et al. | ............. 359/342 |
| 6,906,339 B2 * | 6/2005 | Dutta | ........................... 257/40 |
| 6,911,082 B2 * | 6/2005 | Sato et al. | ..................... 117/68 |
| 2003/0228761 A1 * | 12/2003 | Sato et al. | ................... 438/689 |
| 2004/0048272 A1 * | 3/2004 | Willner et al. | ................. 435/6 |

FOREIGN PATENT DOCUMENTS

| | | |
|---|---|---|
| JP | 2002-525394 | 9/1999 |
| JP | 2004008982 A * | 1/2004 |
| JP | 2004352594 A * | 12/2004 |
| WO | WO 99/26299 | 11/1998 |
| WO | WO 00/17656 | 9/1999 |
| WO | WO 02/31191 A2 | 9/2001 |
| WO | WO 02/055186 A2 | 10/2001 |

OTHER PUBLICATIONS

Torimoto, T. et al, J.Phys. Chem B, "Characterization of Ultrasmall CdS Nanoparticles Prepared by teh Size-Selective Photoetching Technique" Jun. 2001, vol. 105, pp. 6838-6845.*

(Continued)

*Primary Examiner*—Anita K Alanko
(74) *Attorney, Agent, or Firm*—Reed Smith LLP; Stanley P. Fisher, Esq.; Juan Carlos A. Marquez, Esq.

(57) ABSTRACT

This invention provides a method for converting materials for stabilizing surfaces of semiconductor nanoparticles. In this method, surfaces of semiconductor nanoparticles are first modified and then dissolved by photoetching in the presence of materials for stabilization to obtain nanoparticles that are stabilized in an aqueous solution.

2 Claims, 4 Drawing Sheets

OTHER PUBLICATIONS

Gerion, D. et al "Synthesis and Properties of Biocompatible Water-Soluble Silica-Coated CdSe/ZnS Semiconductor Quantum Dots" J. Phys. Chem B 2001, 105, 8861-8871, Jun. 5, 2001.*

Kevin L. Stokes, Jiye Fang and Charles J. O'Connor, "Synthesis and Properties of Bismuth Nanocrystals", 18th International Conference on Thermoelectrics (1999), pp. 374-377.

Tsukasa Torimoto, Hironori Kontani, Yoshihiro Shibutani, Susumu Kuwabata, Takao Sakata, Hirotaro Mori, and Hiroshi Yoneyama, "Characterization of Ultrasmall CdS Nanoparticles Prepared by the Size-Selective Photoetching Technique", J. Phys. Chem. B, vol. 105, No. 29, 2001, pp. 6838-6845.

Masahide Miyake, Tsukasa Torimoto, Takao Sakata, Hirotaro Mori, and Hiroshi Yoneyama, "Photoelectrochemical Characterization of Nearly Monodisperse CdS Nanoparticles—Immobilized Gold Electrodes", Langmuir, vol. 15, No. 4, 1999, 15. pp. 1503-1507.

European Search Report, dated Sep. 30, 2003.

European Search Report dated Apr. 4, 2006.

Tsukasa Torimoto et al., "Characteristic Features of Size-Selective Photoetching of CdS nanoparticles as a Means of Preparation of Monodisperse Particles", J. Electrochem. Soc., vol. 145, No. 6, Jun. 1998, pp. 1964-1968.

* cited by examiner

METHOD FOR CONVERTING AND PURIFYING MATERIALS FOR MODIFYING SURFACES OF SEMICONDUCTOR NANOPARTICLES

TECHNICAL FIELD

The present invention relates to a method for converting oil-soluble semiconductor nanoparticles into water-soluble stabilized semiconductor nanoparticles and regulating particle sizes of the aforementioned semiconductor nanoparticles.

BACKGROUND ART

Semiconductor nanoparticles whose particle sizes are 10 nm or less are located in the transition region between bulk semiconductor crystals and molecules. Their physicochemical properties are therefore different from both bulk semiconductor crystals and molecules. In this region, due to the quantum-size effect, the energy gap of semiconductor nanoparticles increases as their particle sizes decrease. In addition, the degeneration of the energy band that is observed in bulk semiconductors is removed and the orbits are dispersed. As a result, the lower-end of the conduction band is shifted to the negative side and the upper-end of the valence band is shifted to the positive side.

Semiconductor nanoparticles of CdS can be easily prepared by dissolving equimolar amounts of precursors of Cd and S. This is also true for the manufacturing of, for example, CdSe, ZnS, ZnSe, HgS, HgSe, PbS, or PbSe.

Semiconductor nanoparticles have drawn attention since they emit strong fluorescences whose full widths at half maximum are narrow. Thus, various fluorescent colors can be created, and numerous future applications, for example, detection of genes or proteins, optical devices, or the use thereof in the medical field, can be expected. However, the semiconductor nanoparticles obtained only by mixing the precursors with each other as described above have a wide distribution of particle sizes and therefore cannot provide the full advantage of the properties of semiconductor nanoparticles. Accordingly, attempts have been made to attain a monodisperse distribution by using chemical techniques to precisely separate and extract only the semiconductor nanoparticles of a specific particle size from semiconductor nanoparticles having a wide distribution of particle sizes immediately after preparation. The attempts to attain a monodispersed distribution of particle sizes that have been reported so far include: separation by electrophoresis that utilizes variation in the surface charge of nanoparticles depending on their particle sizes; exclusion chromatography that utilizes differences in retention time due to different particle sizes; and size-selective precipitation that utilizes differences in dispersibility in an organic solvent due to differences in particle sizes.

A method was described above wherein the nanoparticles, which were prepared by mixing the precursors with each other, were separated depending on their particle sizes. Also reported is size-selective photoetching that attains a monodispersed distribution of particle sizes by utilizing the oxidative dissolution of a metal chalcogenide semiconductor in the presence of dissolved oxygen when irradiated with light.

There is also a method wherein a monodispersed distribution of particle sizes is attained through regulation at the phase of mixing the precursors with each other. A representative example thereof is the reversed micelle method. In the reversed micelle method, amphiphilic molecules such as diisooctyl sodium sulfosuccinate are mixed with water in an organic solvent such as heptane to form a reversed micelle therein, and precursors are allowed to react with each other only in an aqueous phase in the reversed micelle. The size of the reversed micelle is determined according to the quantitative ratio of the amphiphilic molecules to water, and its size can be relatively uniformly regulated. The sizes of prepared semiconductor nanoparticles depend on the size of the reversed micelle. Thus, semiconductor nanoparticles with relatively homogenous particle sizes can be prepared.

An example of a representative method for preparing semiconductor nanoparticles was provided above, although suitable preparation methods vary depending on materials constituting semiconductor nanoparticles. For example, CdSe is generally prepared in a coordinated solvent at a relatively high temperature. In contrast, CdS can be prepared by a method equivalent to the aforementioned method. However, it is more suitable to prepare CdS in an aqueous solution by size-selective photoetching.

As mentioned above, the present inventors have attempted to develop a method of size-selective photoetching wherein semiconductor nanoparticles are prepared in an aqueous solution. In accordance therewith, they have examined materials for surface modification in an aqueous solution. Accordingly, a method for preparing semiconductor nanoparticles is selected depending on materials constituting the semiconductor nanoparticles. When a preparation method that is carried out in an aqueous solution is not suitable, various techniques that have been developed for use in an aqueous solution could not be applied to the resulting semiconductor nanoparticles.

More specifically, in order to apply the results of the research conducted by the present inventors to various materials for semiconductor nanoparticles, nanoparticles, which were prepared outside of an aqueous solution, had to be converted into conditions equivalent to semiconductor nanoparticles, which were prepared in an aqueous solution.

The present invention is aimed at finding a solution to the above problem. The first aspect of the present invention relates to a method for converting materials for modifying surfaces of semiconductor nanoparticles wherein semiconductor nanoparticles are modified with oil-soluble materials for surface modification, the oil-soluble materials for surface modification are converted into water-soluble materials for surface modification at the interface between an organic solvent and water, and the semiconductor nanoparticles are shifted from an organic phase to an aqueous phase by the aforementioned conversion.

Semiconductor nanoparticles that are used in the present invention are not particularly limited, and conventional nanoparticles represented by a general formula MX are used. In this formula, M is a metal atom and selected from Zn, Cd, Hg, In, Ga, Ti, W, Pb, and the like, and X is selected from O, S, Se, Te, P, As, N, and the like. Specific examples are ZnO, ZnS, ZnSe, ZnTe, CdO, CdS, CdSe, CdTe, HgS, HgSe, HgTe, InP, InAs, GaN, GaP, GaAs, $TiO_2$, $WO_3$, PbS, and PbSe.

Also, multi-layer semiconductor nanoparticles comprising a core portion and a cover layer can be preferably used. The multi-layer semiconductor nanoparticles that are disclosed in WO99/26299 can be used. A specific example of preferable multi-layer semiconductor nanoparticles comprises a core selected from the group consisting of Cd and X (wherein X represents S, Se, Te, or a mixture thereof) and a cover layer of ZnY (wherein Y represents S or Se and is uniformly laminated on the core). In addition, materials for the core and materials for the cover layer uniformly laminated on the surface of the core are selected from ZnO, ZnS, ZnSe, ZnTe, CdO, CdS, CdSe, CdTe, HgS, HgSe, HgTe, InP, InAs, GaN, GaP, GaAs, $TiO_2$, $WO_3$, PbS, PbSe, or the like. An example thereof is the case of multi-layer semiconductor nanoparticles in which the material for the core is CdS and the material for the cover layer uniformly laminated on the surface of the core is ZnS.

Oil-soluble materials for surface modification are bound to or located on surfaces of semiconductor nanoparticles to dissolve or disperse the semiconductor nanoparticles in an organic solvent. Specifically, preferable examples thereof are tri-n-octylphosphine (TOP) and/or tri-n-octylphosphine oxide (TOPO).

Water-soluble materials for surface modification are bound to or located on surfaces of semiconductor nanoparticles to dissolve or disperse the semiconductor nanoparticles in an aqueous medium. Specifically, a preferable example thereof is a thiol compound such as mercaptopropionic acid (MPA).

The second aspect of the present invention relates to a method for purifying semiconductor nanoparticles wherein semiconductor nanoparticles, the surfaces of which have been modified with the water-soluble materials for surface modification obtained by the first aspect of the present invention, are subjected to size-selective photoetching, thereby regulating particle sizes of the semiconductor nanoparticles, and monodispersing them.

FIG. 1 is a pattern diagram showing embodiments according to the first and the second aspects of the present invention, wherein semiconductor nanoparticles of cadmium sulfide are dissolved in an organic solvent and stabilized with tri-n-octylphosphine (TOP). The TOP therein is converted with the aid of hydrophilic mercaptopropionic acid (MPA) to shift it into an aqueous solution. Subsequently, the semiconductor nanoparticles of cadmium sulfide, which were stabilized with MPA, are subjected to size-selective photoetching and modification with sodium hexametaphosphate (HMP).

Size-selective photoetching takes advantage of the fact that the energy gap of a semiconductor nanoparticle increases due to the quantum-size effect as the particle size thereof decreases and that a metal chalcogenide semiconductor is oxidatively dissolved in the presence of dissolved oxygen when irradiated with light. In this method, the semiconductor nanoparticles having a wide distribution of particle sizes are irradiated with monochromatic light of a wavelength shorter than the wavelength of the semiconductor nanoparticle's absorption edge. This causes only the semiconductor nanoparticles of larger particle sizes to be selectively photoexcited and dissolved, thus sorting the semiconductor nanoparticles into smaller particle sizes. Due to the quantum-size effect, the physicochemical properties of semiconductor nanoparticles depend on their particle sizes. Accordingly, the physical properties of these semiconductor nanoparticles in this state are averaged out and their traits cannot be fully manifested. Thus, a chemical technique, i.e., size-selective photoetching, is utilized to precisely separate and extract only the semiconductor nanoparticles of a specific particle size from semiconductor nanoparticles having a wide distribution of particle sizes immediately after preparation in order to attain monodispersed distributions.

The semiconductor nanoparticles of the present invention have significant fluorescence properties. In particular, the fluorescence properties are strongly exhibited when the semiconductor nanoparticles have a monodispersed distribution of particle sizes. More specifically, the particle sizes of the semiconductor nanoparticles are preferably monodispersed, so that deviations are less than 10% rms in diameter.

The fluorescence emitted by the semiconductor nanoparticles of the present invention has a sharp peak of fluorescence intensity. The semiconductor nanoparticles can also emit fluorescence in a narrow spectrum range of 60 nm or less in terms of the full width at half maximum (FWHM). It is preferably 40 nm or less, and more preferably 30 nm or less in terms of the full width at half maximum (FWHM).

The third aspect of the present invention relates to a method for purifying semiconductor nanoparticles wherein semiconductor nanoparticles, the surfaces of which have been modified with the water-soluble materials for surface modification obtained by the first aspect of the present invention, are subjected to size-selective photoetching, and the dissolution caused thereby is utilized to peel the surfaces of the semiconductor nanoparticles, thereby converting the materials for surface modification.

As described above, surfaces of semiconductor nanoparticles were stabilized by modifying them with, for example, a thiol compound, the modified surfaces were again subjected to size-selective photoetching to etch surfaces only, and substances other than semiconductor nanoparticles were removed by ultrafiltration. This enabled nanoparticles, which were prepared outside of an aqueous solution, to be converted into conditions equivalent to semiconductor nanoparticles prepared in an aqueous solution.

PREFERRED EMBODIMENT OF THE INVENTION

The following examples describe conversion of semiconductor nanoparticles, which were prepared in a coordinated solvent, into semiconductor nanoparticles, which were stabilized with hexamethaphosphoric acid (HMP) obtained when the semiconductor nanoparticles were prepared by size-selective photoetching.

[Preparation of Semiconductor Nanoparticles Modified with Oil-Soluble Materials for Surface Modification]

At the outset, 256.8 mg of cadmium oxide (2 mmol), 1113 mg of tetradecanephosphoric acid (4 mmol), and 7.7 g of trioctylphosphine oxide (TOPO) were placed in a nitrogen atmosphere in a reaction vessel. The temperature was raised to 300° C. to dissolve the cadmium oxide in TOPO. Thereafter, the temperature was reduced to 270° C., and a mixed solution of 32 mg of sulfur powder (1 mmol) in 4 g of TOP was placed in the reaction vessel. Thereafter, the temperature was set at 250° C., and the reaction was allowed to proceed.

Figure 1:
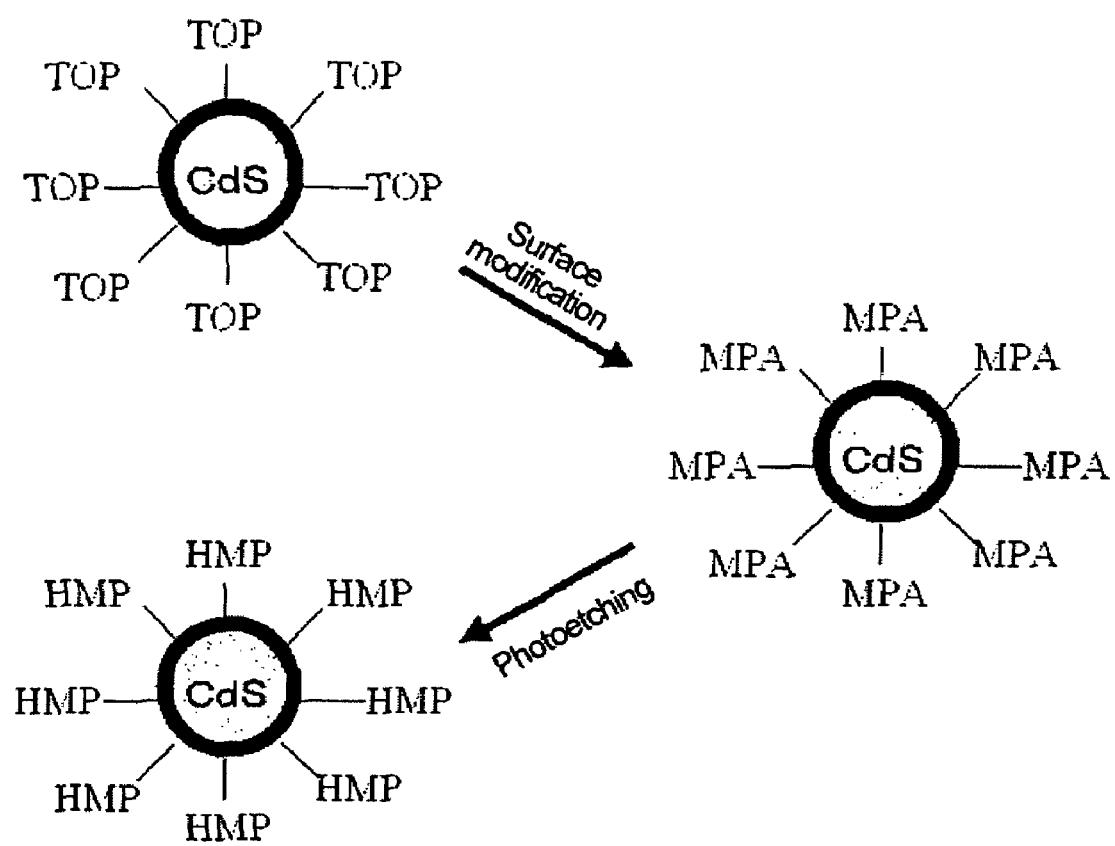
FIG. 1 is a pattern diagram of the present invention.
Figure 2:
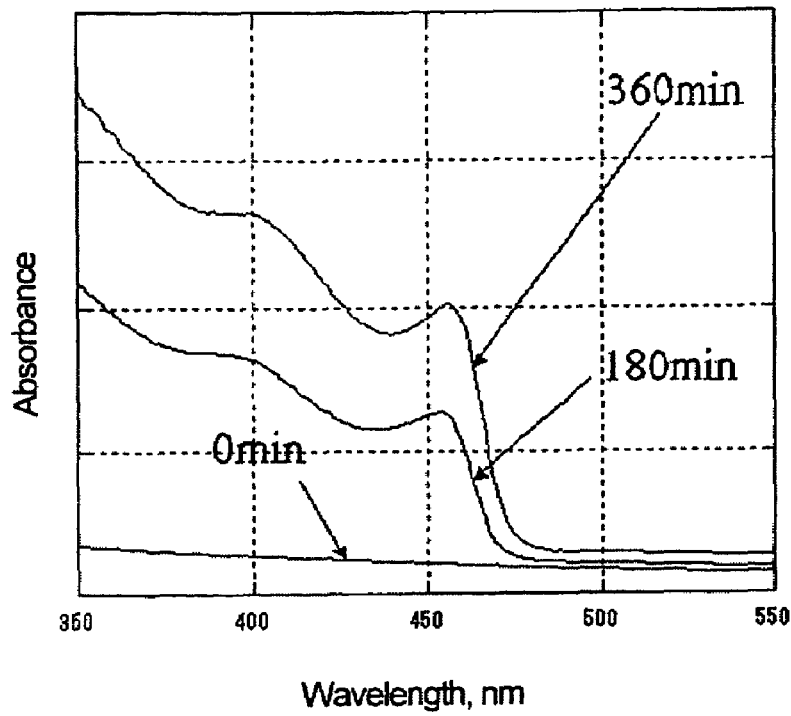
FIG. 2 is a graph showing changes in the absorbance spectrum of the solution with the elapse of time when semiconductor nanoparticles are prepared in a coordinated solvent.
Figure 3:
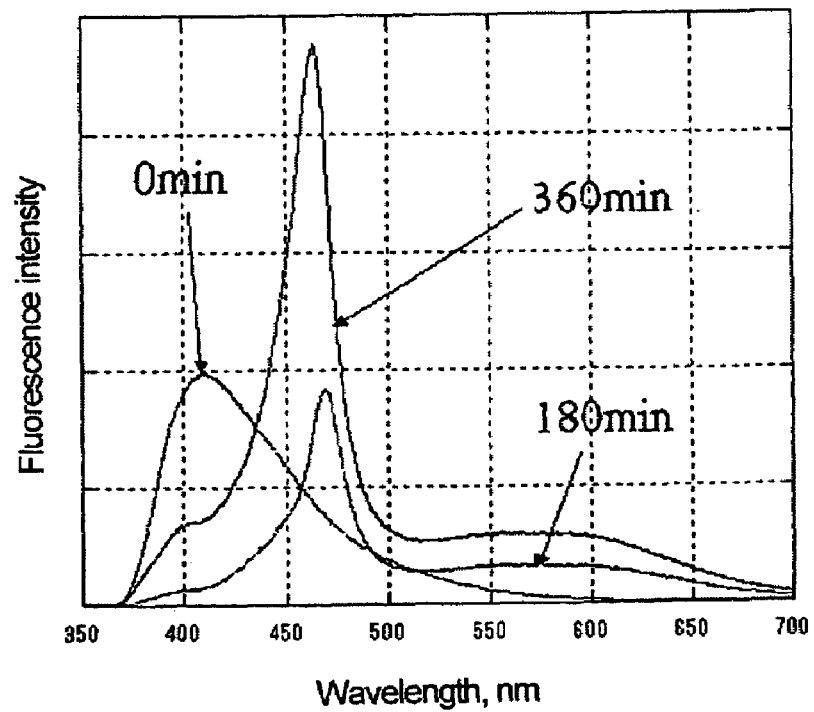
FIG. 3 is a graph showing changes in the fluorescence emission spectrum of the solution with the elapse of time when semiconductor nanoparticles are prepared in a coordinated solvent.

The reaction was continued at the aforementioned temperature for 6 hours. Regarding this reaction, changes in the absorbance with the elapse of time are shown in FIG. 2, and changes in the fluorescence intensity with the elapse of time are shown in FIG. 3. As the reaction time is prolonged, semiconductor nanoparticles having absorbance wavelengths at around 450 nm are gradually formed. In addition, the band gap fluorescence of the semiconductor nanoparticles at a wavelength that is the same as the aforementioned wavelength is increased as shown in FIG. 3.

Thereafter, the whole reaction solution was removed from the reaction vessel using a syringe and rapidly injected into methanol to terminate the reaction. The precipitate generated at this time was isolated by centrifugation. Methanol was added to the resulting precipitate, the mixture was thoroughly stirred, and the supernatant was then removed by centrifugation. This procedure was repeated several times, and the final precipitate was then dissolved in hexane.

Figure 4:
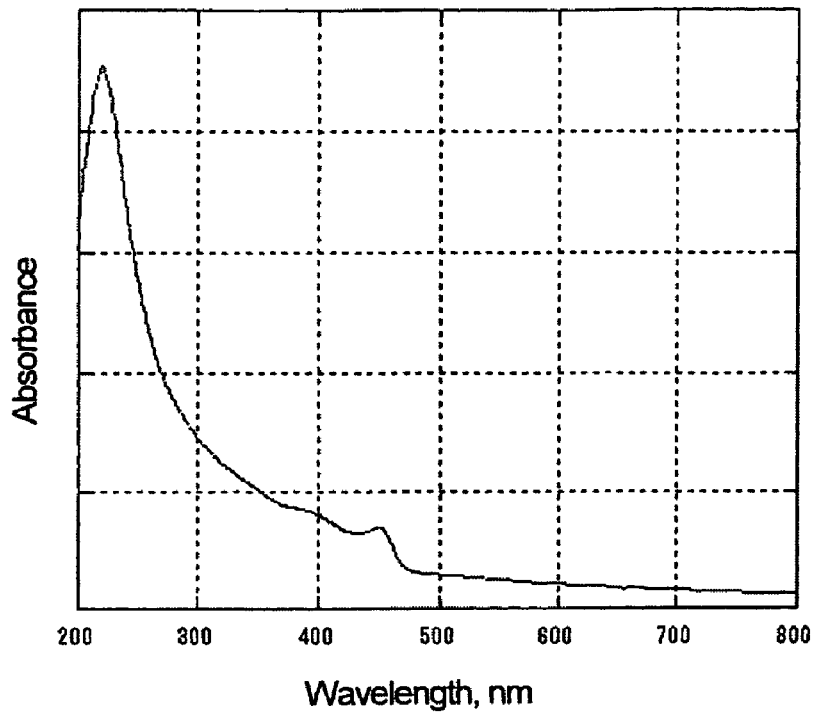
FIG. 4 shows the absorbance spectrum of semiconductor nanoparticles which are dissolved in hexane.
Figure 5:
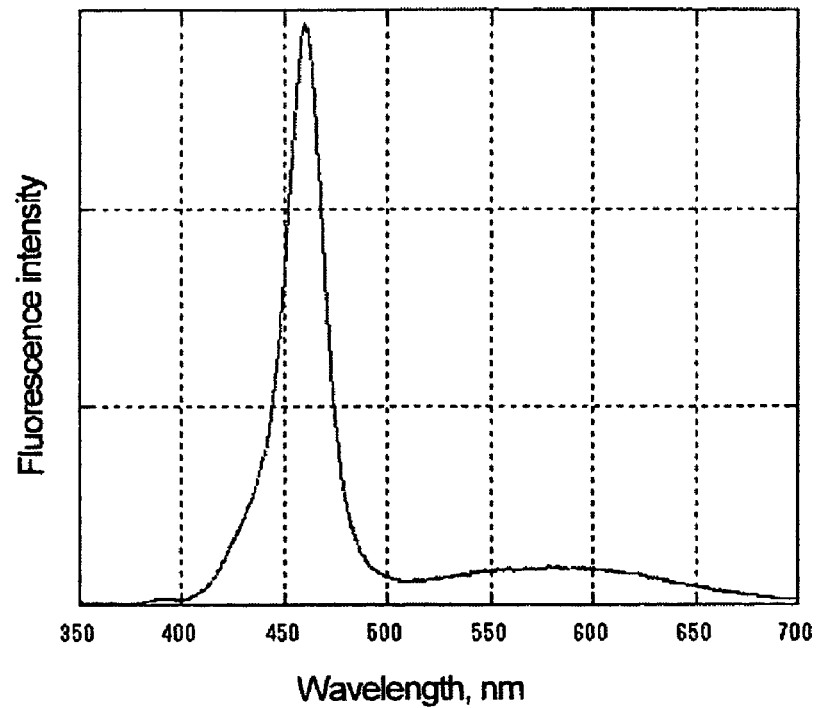
FIG. 5 shows the fluorescence emission spectrum of semiconductor nanoparticles which are dissolved in hexane.

Through the above procedure, semiconductor nanoparticles stabilized with TOP/TOPO were obtained. FIGS. 4 and 5 show the absorbance spectrum and the fluorescence emission spectrum of the nanoparticles dissolved in hexane. FIG. 4 indicates that the particle sizes are monodispersed since the semiconductor nanoparticles clearly exhibit a peak at around 450 nm. According to FIG. 5, it can be confirmed that the semiconductor nanoparticles have a band gap fluorescence at around 450 nm.

[Conversion of Materials for Surface Modification]

In this case, the semiconductor nanoparticles were modified with a thiol compound to make them water soluble. In the past, conversion of materials for surface modification from TOP/TOPO to a thiol compound have been conducted in an aprotic polar solvent such as DMF, although the reaction at the interface between an organic solvent and water has not been conducted. In the present invention, materials for surface modification are converted at the interface between an organic solvent and water. An example of a method for converting TOP/TOPO into a thiol compound is hereafter described.

At the outset, 40 ml of 1M NaOH, 300 μl of mercaptopropionic acid (MPA) and 4 ml of butanol were mixed in that order. A solution of nanoparticles in hexane (40 ml) that was stabilized with TOP/TOPO was added to the mixed solution, and the mixture was shaken at 60° C. for 1 hour. In the above procedure, an optically transparent yellow region is shifted from an organic phase to an aqueous phase. After shaking, octanol was added, so that approximately 30 to 40% of the aqueous phase was composed of octanol, followed by thorough stirring. Thereafter, only the aqueous phase was extracted again. The obtained aqueous phase was concentrated to approximately 10 ml by evaporation, a fourfold to fivefold amount of methanol was added to the aqueous phase, and the resulting precipitate was recovered by centrifugation. The recovered precipitate was dissolved in a small amount of water, a several-fold amount of methanol was further added, and the precipitate was recovered by centrifugation. This procedure was repeated several times, and the precipitate was finally dissolved in 10 ml of pure water to obtain water-soluble nanoparticles.

Accordingly, semiconductor nanoparticles, which were modified with a thiol compound, were obtained.

[Size-Selective Photoetching]

In order to convert semiconductor nanoparticles modified with a thiol compound into semiconductor nanoparticles stabilized with HNP, a thiol compound bound to the surfaces should be removed. In this case, the surfaces of the semiconductor nanoparticles were dissolved by size-selective photoetching.

Size-selective photoetching takes advantage of the fact that the energy gap of a semiconductor nanoparticle increases due to the quantum-size effect as the particle size thereof decreases and that a metal chalcogenide semiconductor is oxidatively dissolved in the presence of dissolved oxygen when irradiated with light. In this method, the semiconductor nanoparticles having a wide distribution of particle sizes are irradiated with monochromatic light of a wavelength shorter than the wavelength of the semiconductor nanoparticle's absorption edge. This causes only the semiconductor nanoparticles of larger particle sizes to be selectively photoexcited and dissolved, thus sorting the semiconductor nanoparticles into smaller particle sizes. In this process, semiconductor nanoparticles in the solution are monodispersed and come to have a band gap fluorescence depending on the monochromatic light irradiated and the particle size of the semiconductor nanoparticles. The present invention makes use of the fact that a reaction caused along with the aforementioned reaction is carried out on the surfaces. When dissolving surfaces of semiconductor nanoparticles during the aforementioned reaction, a thiol compound bound to the surfaces are dissociated together with the dissolved surfaces, and the surfaces of the semiconductor nanoparticles after dissolution are stabilized with HMP. Thus, semiconductor nanoparticles stabilized with HMP can be obtained. An example thereof is described below.

Figure 6:
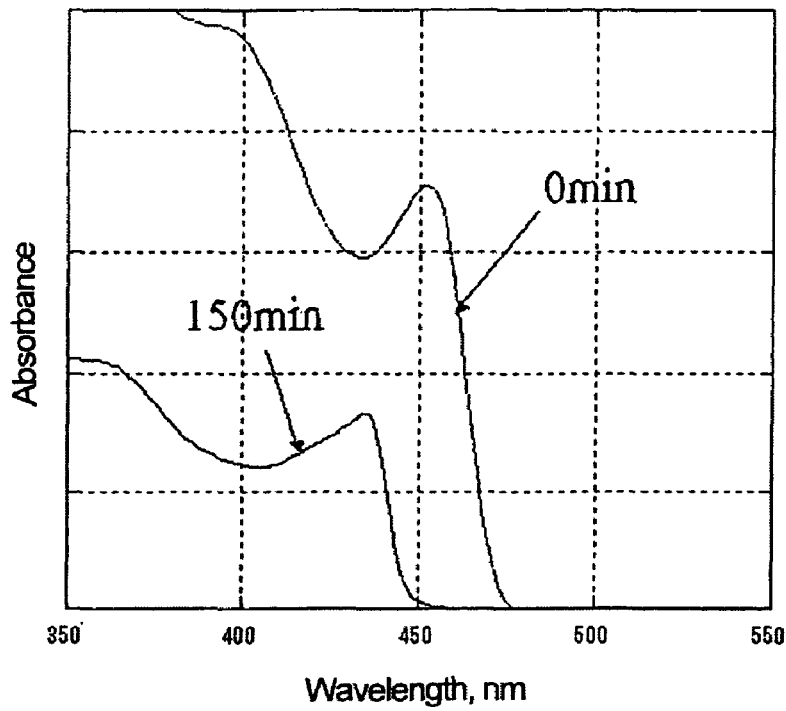
FIG. 6 is a graph showing changes in the absorbance spectrum of the solution with the elapse of time when the reaction is conducted by size-selective photoetching.
Figure 7:
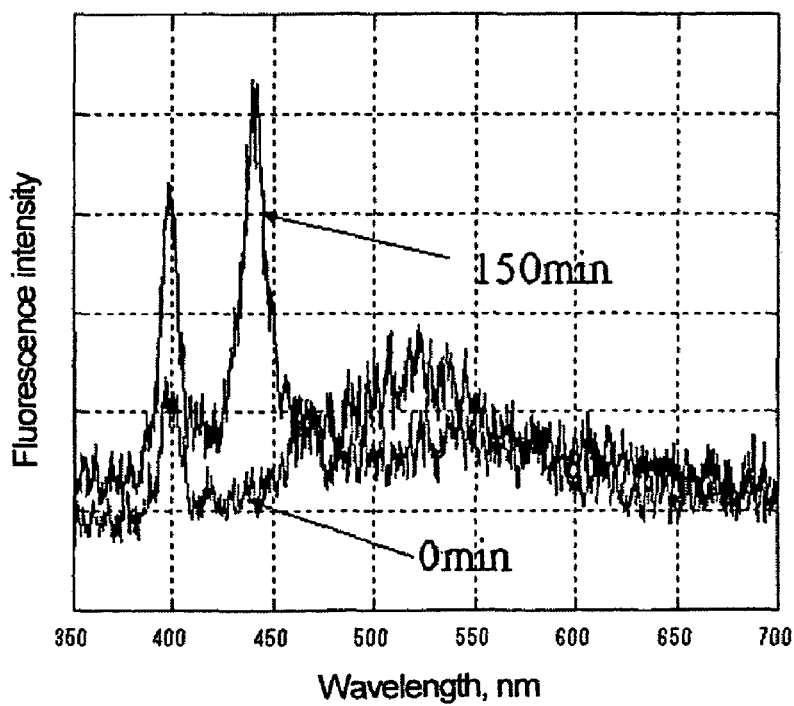
FIG. 7 is a graph showing changes in the fluorescence emission spectrum of the solution with the elapse of time when the reaction is conducted by size-selective photoetching.

An aqueous solution (1000 ml) having an absorbance of 0.2 was prepared from the semiconductor nanoparticles, the surfaces of which have been modified with MPA. Sodium hexametaphosphate (HMP, 61.8 mg, 0.1 mmol) was added to the aqueous solution. Thereafter, the solution was subjected to bubbling with nitrogen gas, followed by further bubbling with oxygen for 10 minutes. Thereafter, methyl viologen was added to the solution at 50 μmol/l, and monochromatic light was applied while stirring. The application of monochromatic light in the present invention was carried out for the purpose of photodissolution of the surfaces of the semiconductor nanoparticles. The wavelength of the monochromatic light was determined to be approximately 440 nm. The surfaces of the semiconductor nanoparticles after the surface dissolution were protected by HMP simultaneously with dissolution, thereby preventing them from being aggregated. Thus, semiconductor nanoparticles stabilized with HMP were obtained. FIG. 6 shows changes in the absorbance spectrum of the solution with the elapse of time, and FIG. 7 shows changes in the fluorescence emission spectrum with the elapse of time, when irradiated with monochromatic light. As is apparent from FIG. 6, the distribution of particle sizes is shifted toward the shorter wavelength side through the reaction by size-selective photoetching. FIG. 7 demonstrates that the band gap fluorescence of semiconductor nanoparticles is shifted toward the shorter wavelength side as the absorbance wavelength is shifted. These results indicate that the surfaces of thiol-modified semiconductor nanoparticles were dissolved.

The aforementioned method can be applied for purifying semiconductor nanoparticles. For example, the nanoparticles modified with a thiol compound are washed using an ultrafiltration device to remove impurities other than the semiconductor nanoparticles. Thereafter, only the surfaces of the semiconductor nanoparticles are dissolved in an HMP solution by size-selective photoetching. Thus, a highly purified solution of semiconductor nanoparticles can be obtained. Accordingly, this technique can be applied for purifying semiconductor nanoparticles.

Effect of the Invention

A technique of preparing and stabilizing semiconductor nanoparticles in an aqueous solution is very useful from an industrial point of view. However, currently common methods are for the preparation of semiconductor nanoparticles in a coordinated solvent, and thus, the final nanoparticles were water insoluble. The present invention enabled conversion of nanoparticles prepared outside of an aqueous solution into a state equivalent to that of semiconductor nanoparticles prepared in an aqueous solution, and stabilization and modification of nanopoarticles in an aqueous solution. Placement of semiconductor nanoparticles in an aqueous solution enabled the application of size-selective photoetching to nanoparticles of CdSe or the like, which could not be previously subjected to size-selective photoetching.

What is claimed is:

1. A method for purifying semiconductor nanoparticles, comprising the steps of:

modifying semiconductor nanoparticles with oil-soluble materials for surface modification;

converting the oil-soluble materials for surface modification into water-soluble materials for surface modification at the interface between an organic solvent and water;

shifting the semiconductor nanoparticles from an organic phase to an aqueous phase by the conversion;

removing impurities other than semiconductor nanoparticles;

setting a wavelength of monochromatic light for size-selective etching to be shorter than a wavelength of absorption edge of the semiconductor nanoparticles having at least one desired particle size so as to dissolve and peel the surface of the semiconductor nanoparticles by size-selective photoetching, regulate desired particle sizes of the semiconductor nanoparticles and monodisperse the semiconductor nanoparticles; and then applying size-selective photoetching to the semiconductor nanoparticles so as to regulate particle sizes of the semiconductor nanoparticles and monodisperse the semiconductor nanoparticles, the surfaces of which have been modified with the water-soluble materials for surface modification, by irradiating the semiconductor nanoparticles with monochromatic light of the set wavelength.

2. A method for purifying semiconductor nanoparticles, comprising the steps of:

modifying semiconductor nanoparticles with oil-soluble materials for surface modification;

converting the oil-soluble materials for surface modification into water-soluble materials for surface modification at the interface between an organic solvent and water;

shifting the semiconductor nanoparticles from an organic phase to an aqueous phase by the conversion;

removing impurities other than the semiconductor nanoparticles;

setting a wavelength of monochromatic light of to be shorter than a wavelength of absorption edge of the semiconductor nanoparticles having at least one desired particle size so as to dissolve and peel the surface of the semiconductor nanoparticles by size-selective photoetching, and thereby convert the materials for surface modification; and then applying size-selecting etching to the semiconductor nanoparticles so as to dissolve and peel the surface of the semiconductor nanoparticles by size-selective photoetching, and convert the materials for surface modification by irradiating the semiconductor nanparticles with monochromatic light of the set wavelength, the surfaces of which have been modified with the water-soluble materials for surface modification.

* * * * *